United States Patent [19]

Wilding

[11] Patent Number: 4,937,967
[45] Date of Patent: Jul. 3, 1990

[54] FISH CATCH STORE FOR BOATS

[76] Inventor: John Wilding, The Boat House, Halton-on-Lune, Lancaster, Great Britain

[21] Appl. No.: 353,980

[22] Filed: May 19, 1989

[30] Foreign Application Priority Data

Aug. 12, 1988 [GB] United Kingdom ............... 8819208
Mar. 9, 1989 [GB] United Kingdom ............... 8905375

[51] Int. Cl.⁵ ............................................. A01K 97/00
[52] U.S. Cl. .................................................. 43/55
[58] Field of Search ...................... 43/55, 56; 119/3, 5; 224/920

[56] References Cited

U.S. PATENT DOCUMENTS

| | | | |
|---|---|---|---|
| 1,996,303 | 4/1935 | McConnell | 43/55 |
| 2,564,513 | 8/1951 | Terwilliger | 43/55 |
| 2,591,891 | 4/1952 | Thorsen | 43/55 |
| 2,726,477 | 12/1955 | Firkins | 43/55 |
| 2,729,016 | 1/1956 | McDaniel | 43/55 |
| 2,990,642 | 7/1961 | Bloom | 43/55 |
| 3,854,236 | 12/1974 | Goserud | 43/55 |
| 3,938,276 | 2/1976 | Mettler | 43/55 |

Primary Examiner—Kurt Rowan
Attorney, Agent, or Firm—Lackenbach Siegel Marzullo & Aronson

[57] ABSTRACT

A fish catch store for boats comprises an open-topped bag (40) that is hung from a frame (48) and allows water to enter through its sides. The frame (48) extends (50) from a mount spigot (52) entrant a mount socket (20) through the top of the boat gunwhale (14). As a matter of choice, the spigot (52) can be mounted in the socket (20) with the bag (40) hanging outside or inside the boat.

4 Claims, 2 Drawing Sheets

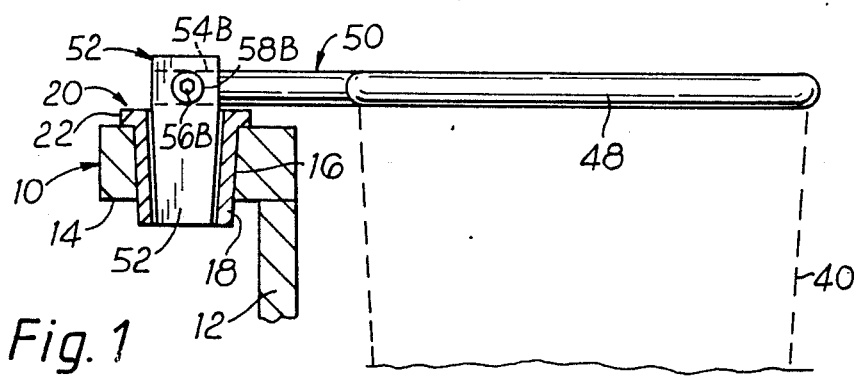
Fig. 1
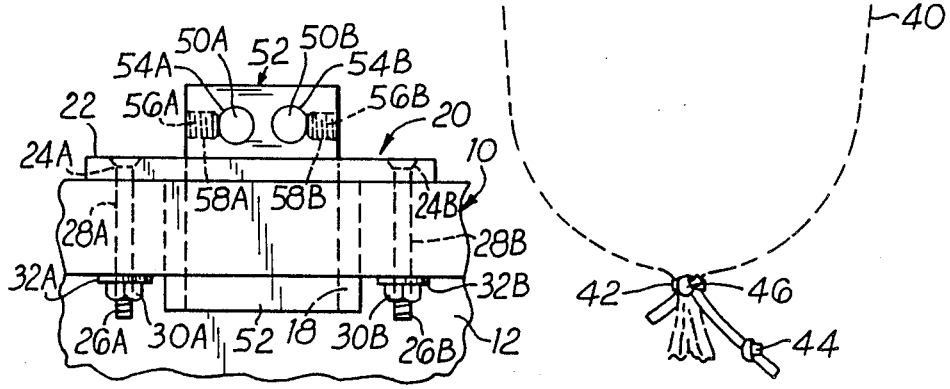
Fig. 3
Fig. 2
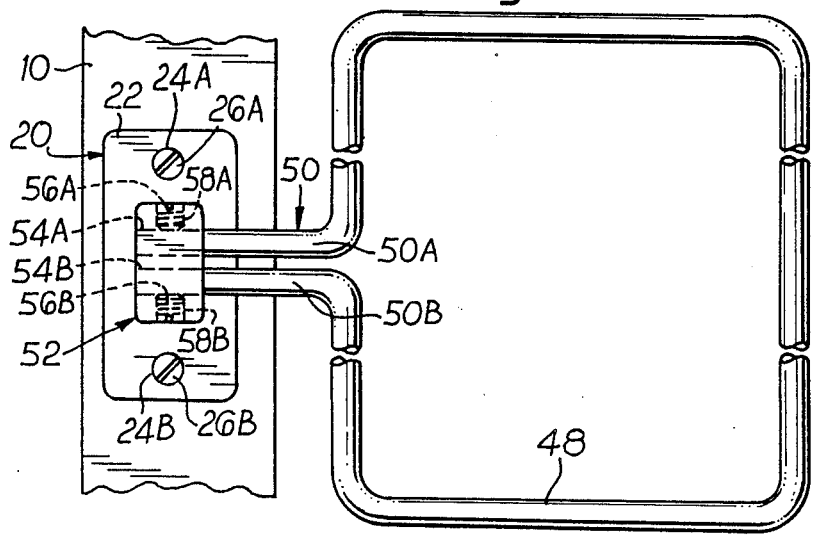

FISH CATCH STORE FOR BOATS

This invention relates to storing catch caught by fishing from a boat.

It is usual when fishing from a boat for catch to be stored inside the boat where it can quickly lose freshness even deteriorate to a maladorous state, especially in hot conditions. As a frequent angler from boats at sea, usually operating on an inshore basis over the continental shelf, I have long considered the problems dealing with keeping my catch in good condition and have tried various ways of doing so, hitherto without achieving a satisfactory combination of effectiveness and ease of use.

It is an object of this invention to provide an effective and advantageous catch storage arrangement.

In arriving at this invention I have particularly considered, in fact achieved, the possibility of modifying the principle of a keep-net as used by anglers fishing from river banks but now for use with a boat.

Accordingly, in one aspect of this invention, there is provided a combination of a boat, an open topped bag permitting the passage of water through its sides and/or bottom, and means mounting the bag to the boat with the bag depending alternatively into the water outboard of the boat from its open top located above water level and itself outboard of the boat, and depending inboard of the boat. Preferred mounting means comprises a fixed socket let downwardly into the boat, typically at or associated with its gunwhale, and a spigot means carrying the bag.

Flexible material, typically of open work or net type, for the bag can depend from a frame holding its top open which frame extends from the mounting means, preferably to clear the rubbing streak on the freeboard of the boat.

In order to bring the bag and its contents inboard of the boat, the bag can be releasably mounted relative to the boat.

According to another aspect of this invention, there is provided an open-topped bag permitting water entry through sides and/or bottom in combination with a spigotted mount part by which the bag is releasably attachable to a socketed mount part for a boat, so as to be dropped in and lifted off in either of two orientations, one outboard with the bag depending into the water, the other inboard also with the bag depending therefrom.

A net is readily threaded onto a peripheral frame, particularly one whose ends are releasably secured to the other mounting part, say as extensions from the net frame proper which can be engaged by securement means such as grub screws in the aforesaid block.

It is further preferred that the bag be elongate and capable of being closed off selectively at various lengths, as can be achieved by a rope or cord threaded through and round a tubular net.

Specific implementation will now be described, by way of example with reference to the accompanying drawing, in which:

FIG. 1 is a side view of one embodiment;

FIG. 2 is a corresponding plan view;

FIG. 3 is a part-sectional end view of the same embodiment; and

Figure 4:
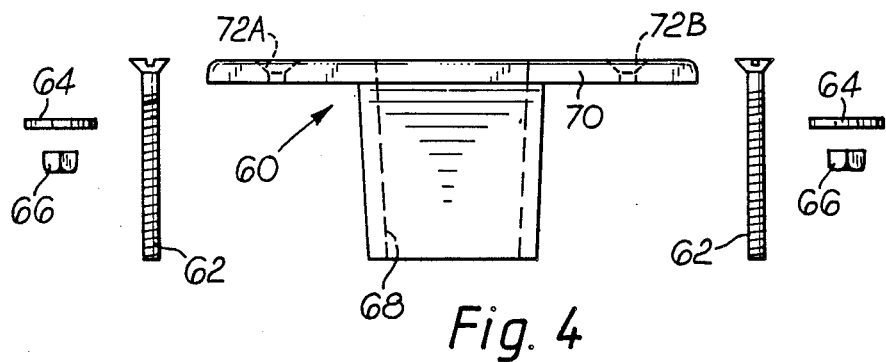
FIGS. 4 to 10 show details of parts for another embodiment.

In FIGS. 1 to 3, a fragment of boat gunwhale, shown at 10 above freeboard 12, has an inboard ledge 14. The ledge 14 has a hole 16 to take a socket 18 of a mounting part 20 having a plate 22 from which the socket 18 depends. The plate 22 also has apertures 24A, 24B for fixing bolts 26A, 26B also passing through holes 28A, 28B through the ledge 14 clamping securement by nuts 30A, 30B and washers 32A, 32B. It is preferred that heads of bolts 26A, 26B are of countersunk screwdriver-engagement type, and the thickness of the plate 22 may also be let into the top of the gunwhale for neatness of appearance and finish.

A storage bag 40 is shown dashed to indicate freedom for passage therethrough of water and is conveniently of net with a bottom closure cord 42 threaded through and knotted at 44 then pulled tight to close off net and further knotted at 46.

The bag 40 depends from a frame 48 shown as substantially rectangular, though other shapes could be used, and made from a bent-up length of rod bar or tube with ends together at 50 as an extension to the frame proper. A netting bag 40 can be threaded onto the frame 48 before its ends 50A, 50B are brought together at 50 or at least before those ends are secured in a block 52. Such securement is shown in parallel through-holes 54A, 54B (though they could be blind if preferred) and by way of grub screws 56A, 56B in cross bores 58A, 58B, say of stiffen-key operated type. The ends of the frame 48 may be indented to aid location in the block 52.

The block 52 is shown extending downwards from the frame mounting position (54A, 54B) and is a good but readily releasably loose fit as a spigot in the socket 18. The block is shown with a generally rectangular section, in fact generally cuboid overall, but can be of any convenient non-circular section (the socket 18 to match) and may be tapered for ease of fitting and lifting out.

It will be appreciated that the extension represented by the ends of the frame at 50 can readily afford clearance of the gunwhale and the rubbing streak of the boat. Indeed, that extension may be adjustable in through-holes 54A, 54B and ends of the frame 48 may have spaced indentations for location at alternative extensions. Moreover, the cooperating mounting parts represented by the socket 18 and the block 52 extending therewith readily permit alternative mounting attitudes, one with the frame 48 and bag 40 outboard of the boat and the other with them inboard of the boat, i.e. extending to either side of the gunwhale 10.

When to the outboard side of the gunwhale 10 (as shown), the bag 40 should depend well below water level and be effectively closed off at a suitable length along its tubular extent using the cord 42.

At least when positioned inboard of the boat, i.e. the frame 48,50 directed to the left rather than to the right in FIG. 1, the frame 48 can usefully serve to carry a top or gutting board, which could have engagement means fixed to its underside to cooperate for location, even retention, purposes with that frame 48, say as a depending rib or ribs to fit inside or outside the frame 48, and/or to engage the extension 50.

Figure 5:
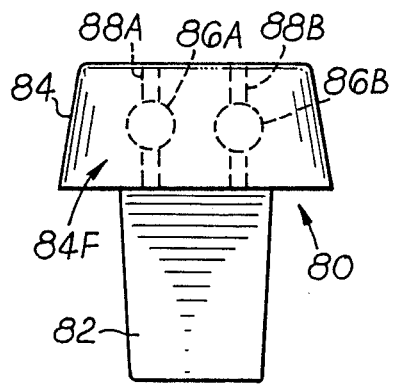
Figure 6:
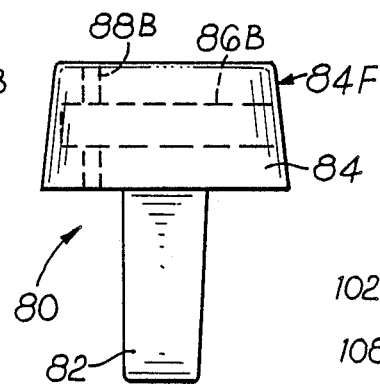
Figure 9:
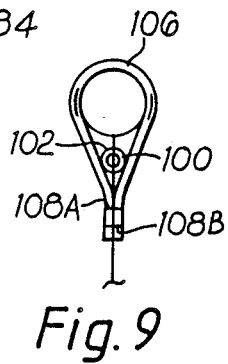
Figure 7:
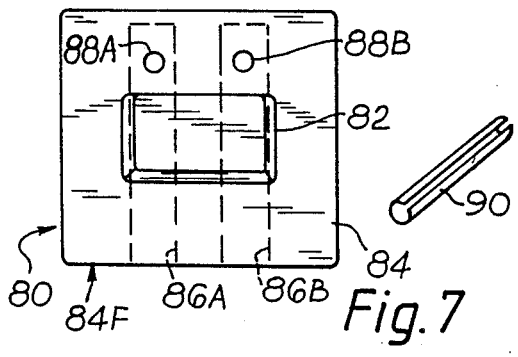
Figure 8:
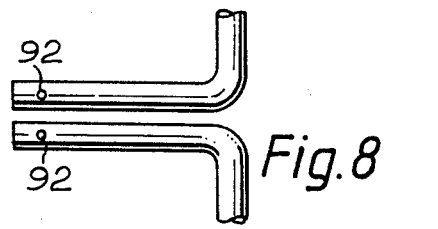
Figure 10:
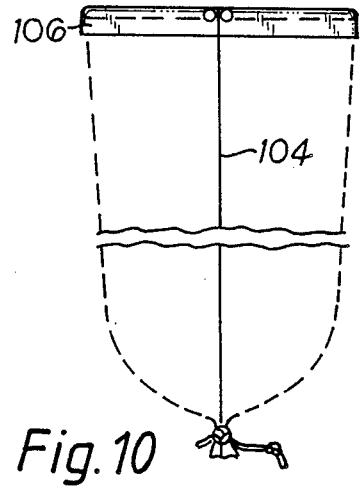

A second embodiment is shown in FIGS. 4 to 10. A socketed mounting part 60, which can be of aluminium, say sand-cast or die-cast, is for securement in place by stainless steel screws 62 with related washers 64 and nuts 66. Socket aperture 68 can be substantially centrally disposed in the fixing plate 70. Cheese head screws 62 and countersunk holes 72A,B in the plate 70 are preferred for a flush finish. A spigot mounting part 80 has a spigot 82 depending from a head 84 and can also be of aluminium, say sand-cast or die-cast. The head 84 has parallel bores 86A, 86B in one major face 84F for ends of net framing rod, and intersecting smaller bores 88A, 88B for fixings. Preferred fixings, see 90, also entering registering holes, see 92, through the ends of the net framing rod, and are shown conveniently as being of split spring-sleeve type to require simple knocking into place. The bores 86A, 86B and 88A, 88B are shown blind, which is distinctly advantageous.

Moreover, securement of ends of the frame past the spigot formation is advantageous particularly in avoiding undue stress where the frame exits the head.

Preferred framing rod is of steel and has its ends bored for the aforesaid fixings 90A, 90B, preferably in the head 84 and made at the same time as bores 88A, 88B are made in the head 84, before spraying with protective coating material, typically of proprietary salt-air resistant epoxy type.

Preferred netting is of knotless diamond mesh type, which hangs particularly well. Preferred finishing of the net (FIGS. 9 and 10) involves cord passing about top edges (100) overlock stitched in place (102) and down a joint (104) from top to bottom, then securing to doubled over banding (106) using double stiching (108A, 108B), with leaving frame rod accommodation between the turn of the banding (106) and the top cording (102) of the net. A typical conventional frame size is about 18 inches (say 45 cm) by 12 inches (say 30 cm).

I claim:

1. A catch storage apparatus for a seaworthy fishing boat, comprising in combination:

an open-topped enclosure permitting water entry through at least a surface thereof;

a frame supporting said enclosure at its open top so said enclosure is suspended therefrom, and said frame having ends extending in close, but spaced parallel relation;

a first mount having parallel spaced holes in one face thereof for receiving said ends of the frame and for removably securing same in said holes, and further having a spigot extending from another face in a direction parallel to the enclosure suspended from said frame;

a second mount attached to a gunwhale of said boat and having an extending formation in the form of a socket to receive said spigot of said first mount; and said spigot and said socket having cooperating formations defining at least two alternative positions for engagement when mated together, such that in at least one position, said frame is outboard of said gunwhale with the enclosure depending therefrom into the water, and in another position, said frame is inboard of said gunwhale and the enclosure depending therefrom inside said boat.

2. The catch storage apparatus according to claim 1, wherein the frame is a shaped bar-like material, and said enclosure is a net bag threaded onto the frame.

3. The catch storage apparatus according to claim 2, wherein said net bag is tubular and has threaded therethrough at a desired position a draw rope closure cord for closure of said net adjacent the bottom of the bag.

4. The catch storage apparatus according to claim 1, in further combination with a closure board/gutting table adapted to fit about the open top of the enclosure.

* * * * *